US011869482B2

(12) United States Patent
Cui et al.

(10) Patent No.: US 11,869,482 B2
(45) Date of Patent: Jan. 9, 2024

(54) SPEECH WAVEFORM GENERATION

(71) Applicant: Microsoft Technology Licensing, LLC, Redmond, WA (US)

(72) Inventors: Yang Cui, Redmond, WA (US); Xi Wang, Redmond, WA (US); Lei He, Redmond, WA (US); Kao-Ping Soong, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 406 days.

(21) Appl. No.: 17/272,325

(22) PCT Filed: Sep. 30, 2018

(86) PCT No.: PCT/CN2018/109044
§ 371 (c)(1),
(2) Date: Feb. 28, 2021

(87) PCT Pub. No.: WO2020/062217
PCT Pub. Date: Apr. 2, 2020

(65) Prior Publication Data
US 2021/0193112 A1 Jun. 24, 2021

(51) Int. Cl.
*G10L 13/047* (2013.01)
(52) U.S. Cl.
CPC .................... *G10L 13/047* (2013.01)
(58) Field of Classification Search
CPC ....... G10L 13/047; G10L 13/02; G10L 25/48; G10L 13/04; G10L 15/02; G10L 15/24;
(Continued)

(56) References Cited

U.S. PATENT DOCUMENTS

| 4,820,059 A | * | 4/1989 | Miller | ..................... G10L 15/04 704/E15.005 |
| 5,903,866 A | | 5/1999 | Shoham | |

(Continued)

FOREIGN PATENT DOCUMENTS

| CA | 2656130 A1 | 12/2007 |
| CN | 1181149 A | 5/1998 |

(Continued)

OTHER PUBLICATIONS

Bollepalli ("Generative adversarial network-based glottal waveform model for statistical parametric speech synthesis", Proc. Interspeech 2017, Aug. 20-24, 2017, Stockholm, Sweden pp. 3394-3398) (Year: 2017).*

(Continued)

*Primary Examiner* — Abdelali Serrou
(74) *Attorney, Agent, or Firm* — Schwegman Lundberg & Woessner, P.A.

(57) ABSTRACT

A method and apparatus for generating a speech waveform. Fundamental frequency information, glottal features and vocal tract features associated with an input may be received, wherein the glottal features include a phase feature, a shape feature, and an energy feature (1310). A glottal waveform is generated based on the fundamental frequency information and the glottal features through a first neural network model (1320). A speech waveform is generated based on the glottal waveform and the vocal tract features through a second neural network model (1330).

18 Claims, 10 Drawing Sheets

(58) Field of Classification Search
CPC ......... G10L 17/02; G10L 25/66; G10L 13/07;
G10L 17/26; G10L 19/02; G10L 19/00;
G10L 19/06; G10L 2021/0135; G10L
2021/0575; G10L 21/0364; G10L 25/15;
G10L 25/12; G10L 25/21; G10L 25/24;
G10L 25/30; G10L 25/45; G10L 25/75;
G10L 13/033; G10L 13/06; G10L 15/08;
G10L 19/04; G10L 21/003; G10L 21/013;
G10L 21/04; G10L 25/03; G10L 25/18;
G10L 25/51; G10L 25/63; G10L 25/90;
G10L 25/93; G06F 18/256; G06F 3/16
See application file for complete search history.

(56) References Cited

U.S. PATENT DOCUMENTS

| | | | |
|---|---|---|---|
| 6,804,649 B2* | 10/2004 | Miranda | G10L 13/07 704/E13.007 |
| 6,999,924 B2* | 2/2006 | Burnett | G06F 18/256 704/E15.041 |
| 7,383,176 B2* | 6/2008 | Yasunaga | G10L 19/083 704/219 |
| 8,768,690 B2* | 7/2014 | Gupta | G10L 19/22 704/207 |
| 10,014,007 B2 | 7/2018 | Dachiraju et al. | |
| 10,032,451 B1 | 7/2018 | Mamkina et al. | |
| 10,255,903 B2* | 4/2019 | Dachiraju | G10L 13/027 |
| 10,453,442 B2* | 10/2019 | Chandra | G10L 15/1807 |
| 10,586,526 B2* | 3/2020 | Hua | G10L 25/48 |
| 2003/0088417 A1 | 5/2003 | Kamal et al. | |
| 2012/0143602 A1* | 6/2012 | Byun | G10L 19/06 704/219 |
| 2014/0122063 A1* | 5/2014 | Gomez Vilda | G10L 19/02 704/200.1 |
| 2018/0075343 A1 | 3/2018 | Van et al. | |
| 2018/0330713 A1* | 11/2018 | Hoory | G10L 13/033 |
| 2019/0013005 A1* | 1/2019 | Hua | G10L 13/04 |

FOREIGN PATENT DOCUMENTS

| | | |
|---|---|---|
| CN | 102047321 A | 5/2011 |
| CN | 102411932 A | 4/2012 |
| CN | 107221317 A | 9/2017 |
| CN | 108320733 A | 7/2018 |
| CN | 108369803 A | 8/2018 |
| CN | 108463848 A | 8/2018 |
| JP | 2018036413 A | 3/2018 |
| WO | 2009055701 A1 | 4/2009 |
| WO | 2010031437 A1 | 3/2010 |

OTHER PUBLICATIONS

"Notice of Allowance Issued in European Patent Application No. 18935409.5", dated Feb. 15, 2023, 8 Pages.
"Extended Search Report Issued in European Patent Application No. 18935409.5", dated Apr. 22, 2022, 4 Pages.
Airaksinen, et al., "Noise Robust Estimation of the Voice Source using a Deep Neural Network", In Proceedings of the IEEE International Conference on Acoustics, Speech and Signal Processing, Apr. 19, 2015, pp. 5137-5141.
Bollepalli, et al., "Lombard Speech Synthesis using Long Short-Term Memory Recurrent Neural Networks", In Proceedings of the IEEE International Conference on Acoustics, Speech and Signal Processing, Mar. 5, 2017, pp. 5505-5509.
"Glott-HMM synthesis", Retrieved From: http://web.archive.org/web/20170820073650/http://www.helsinki.fi/speechsciences/synthesis/glott.html, Aug. 20, 2017, 1 Page.
Airaksinen, et al., "GlottDNN—A Full-Band Glottal Vocoder for Statistical Parametric Speech Synthesis", In Proceedings of 17th Annual Conference of the International Speech Communication Association, Sep. 8, 2016, pp. 2473-2477.
Alku, Paavo, "Glottal Wave Analysis with Pitch Synchronous Iterative Adaptive Inverse Filtering", In Journal of Speech Communication, vol. 11, Issue 2-3, Jun. 1992, pp. 109-118.
Arik, et al., "Deep Voice 2: Multi-Speaker Neural Text-to-Speech", In Proceedings of 31st Conference on Neural Information Processing Systems, Dec. 4, 2017, 9 Pages.
Cui, et al., "A New Glottal Neural Vocoder for Speech Synthesis", In Proceedings of 19th Annual Conference of the International Speech Communication Association, Sep. 2, 2018, pp. 2017-2021.
Fan, et al., "TTS Synthesis with Bidirectional LSTM Based Recurrent Neural Networks", In Proceedings of Fifteenth Annual Conference of the International Speech Communication Association, Sep. 14, 2014, pp. 1964-1968.
Jung, et al., "Waveform Interpolation-Based Speech Analysis/Synthesis for HMM-Based TTS Systems", In Journal of IEEE Signal Processing Letters, vol. 19, Issue 12, Dec. 2012, pp. 809-812.
Juvela, et al., "High-Pitched Excitation Generation for Glottal Vocoding in Statistical Parametric Speech Synthesis Using a Deep Neural Network", In Proceedings of International Conference on Acoustics, Speech and Signal Processing, Mar. 20, 2016, pp. 5120-5124.
Kalchbrenner, et al., "Efficient Neural Audio Synthesis", In Repository of arXiv:1802.08435v1, Feb. 23, 2018, 10 Pages.
Kawahara, et al., "Aperiodicity Extraction and Control using Mixed Mode Excitation and Group Delay Manipulation for a High Quality Speech Analysis, Modification and Synthesis System Straight", In Proceedings of Second International Workshop on Models and Analysis of Vocal Emissions for Biomedical Applications, Sep. 13, 2001, pp. 59-64.
Kawahara, et al., "Tandem-Straight: A temporally Stable Power Spectral Representation for Periodic Signals and Applications to Interference-free Spectrum, F0, and Aperiodicity Estimation", In Proceedings of International Conference on Acoustics, Speech and Signal Processing, Mar. 31, 2008, pp. 3933-3936.
Kleijn, et al., "A Speech Coder Based on Decomposition of Characteristic Waveforms", In Proceedings of International Conference on Acoustics, Speech, and Signal Processing, vol. 1, May 9, 1995, pp. 508-511.
Mehri, et al., "SampleRNN: An Unconditional End-to-End Neural Audio Generation Model", In Repository of arXiv:1612.07837v1, Dec. 22, 2016, 11 Pages.
Oord, et al., "Parallel WaveNet: Fast High-Fidelity Speech Synthesis", In Repository of arXiv:1711.10433v1, Nov. 28, 2017, 11 Pages.
Oord, et al., "Wavenet: A Generative Model for Raw Audio", In Repository of arXiv:1609.03499v1. Sep. 12, 2016, 15 Pages.
"International Search Report and Written Opinion issued in PCT Application No. PCT/CN18/109044", dated Jun. 28, 2019, 9 Pages.
Raitio, et al., "Deep Neural Network Based Trainable Voice Source Model for Synthesis of Speech with Varying Vocal Effort", In Proceedings of Fifteenth Annual Conference of the International Speech Communication Association, Sep. 14, 2014, pp. 1969-1973.
Raitio, et al., "HMM-Based Speech Synthesis Utilizing Glottal Inverse Filtering", In Journal of IEEE Transactions on Audio, Speech, and Language Processing, vol. 19, Issue 1, Jan. 2011, pp. 153-165.
Seide, et al., "CNTK: Microsoft's Open-Source Deep-Learning Toolkit", In Proceedings of the 22nd ACM SIGKDD International Conference on Knowledge Discovery and Data Mining, Aug. 13, 2016, p. 2135.
Seide, et al., "microsoft/CNTK", Retrieved From: https://github.com/Microsoft/CNTK, Retrieved on: Mar. 10, 2021, 14 Pages.
Song, et al., "Improved Time-Frequency Trajectory Excitation Vocoder for DNN-Based Speech Synthesis", In Proceedings of 17th Annual Conference of the International Speech Communication Association, Sep. 8, 2016, pp. 2253-2257.
Tamamori, et al., "Speaker-dependent WaveNet Vocoder", In Proceedings of 18th Annual Conference of the International Speech Communication Association, Aug. 20, 2017, pp. 1118-1122.
Wang, et al., "An Autoregressive Recurrent Mixture Density Network for Parametric Speech Synthesis", In Proceedings of International Conference on Acoustics, Speech and Signal Processing, Mar. 5, 2017, pp. 4895-4899.

(56) References Cited

OTHER PUBLICATIONS

Zen, et al., "Statistical Parametric Speech Synthesis", In Journal of Speech Communication, vol. 51, Issue 11, Nov. 2009, 23 Pages.
"First Office Action and Search Report Issued in Chinese Patent Application No. 201880085612.1", dated Dec. 6, 2022, 7 Pages.
"Decision to Grant Issued in European Patent Application No. 18935409.5", dated Jun. 22, 2023, 2 Pages.
"Notice of Allowance Issued in Chinese Patent Application No. 201880085612.1", dated Apr. 28, 2023, 7 Pages.

* cited by examiner

SPEECH WAVEFORM GENERATION

CROSS-REFERENCE TO RELATED APPLICATION

This application is a U.S. National Stage Filing under 35 U.S.C. 371 of International Patent Application Serial No. PCT/CN2018/109044, filed Sep. 30, 2018, and published as WO 2020/062217 A1 on Apr. 2, 2020, which applications and publication are incorporated herein by reference in their entirety.

BACKGROUND

Vocoders are used for speech parameterization and waveform generation in the statistical parametric speech synthesis (SPSS) system. The quality of analysis-by-synthesis reflects the final synthetic speech quality in naturalness and similarity. Source-filter based vocoder is one of the most popular and high quality ways to parameterize, modify, and reconstruct waveform, e.g. STRAIGHT, GlottDNN, IT-FTE, etc., which are proposed to improve the perceptual quality while alleviating the "buzzy" and "muffled" problems. There are two widely used paradigms to produce high quality speech from text: statistical parametric speech synthesis (SPSS) and unit selection (US). The differences between SPSS and UC approaches are mainly the extraction and parameterization methods of excitation signals. Although the existing vocoders have improved the perceptual quality of synthetic speech, an inevitable loss has been caused during the parameterization and reconstruction stage, as there are some assumptions which are not accurate.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for generating a speech waveform. Fundamental frequency information, glottal features and vocal tract features associated with an input may be received. The glottal features may include a phase feature, a shape feature, and an energy feature. The vocal tract features may be parameterized as line spectrum pair (LSP) coefficients, line spectrum frequency coefficients, linear prediction filter coefficients, reflection coefficients, Logarithm area ratio, linear spectrum coefficients, Mel-spectrum coefficients, Mel Frequency Cepstrum Coefficient (MFCC), and so on. A glottal waveform may be generated based on the fundamental frequency information and the glottal features through a first neural network model. A speech waveform may be generated based on the glottal waveform and the vocal tract features through a second neural network model.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Traditional parametric vocoders are designed to generate high quality speech with low computational cost by introducing speech signal processing knowledge. However, the quantization loss and reconstruction loss between the encoder and decoder are irreversible, which causes the "vocoding" effect and makes the synthetic speech sound muffled or buzzy. Autoregressive generative model (e.g., WaveNet) can produce high realistic speech with appropriate conditions. However, the computational and memory cost of such model is too expensive to support runtime synthesis on devices, e.g., smart phone, laptop, portable device, etc.

Although the deep learning techniques have improved the SPSS performance, the quality gap between SPSS and US is still large. The main difference between these two TTS systems is the waveform generator. In a SPSS system, a vocoder is adopted to transform acoustic features into speech waveform, while an US system directly uses unit selection technique to select speech units from speech corpus and then concatenates speech units to produce speech waveform. The synthetic quality of traditional parametric vocoders is limited for the parameterization loss in the encoder and the reconstruction loss in the decoder, which is irreversible and makes the synthetic speech sound muffled or buzzy. Recently, as the rapid development of deep learning and increased computational power, some advanced autoregressive generative models have been successfully applied to generate high fidelity speech. However, these models are computational expensive and cannot be supported to runtime synthesis on CPU or devices. Traditional parametric vocoders have very cheap computational cost by using knowledge of speech signal processing. Thus the domain knowledge may be used to design a neural vocoder, so that the performance and efficiency can be improved.

Embodiments of the present disclosure propose a neural network-based vocoder for high quality speech synthesis with low computational and memory cost. The neural network based vocoder could largely improve the vocoder performance by introducing of knowledge of speech signal processing which can improve the synthesis efficiency to support runtime synthesis. Two models in the neural network-based vocoder may be designed to mimic the source model and the filter model in source filter theory. The neural vocoder may utilize vocoder features with appropriate design of the neural network to achieve waveform-like voice quality as raw waveform in frame-level. At last one training method may be adopted to alleviate the mismatch between these models.

Figure 1:
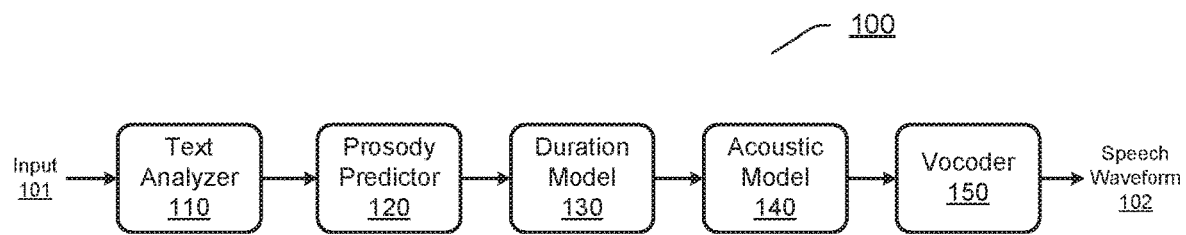
FIG. 1 illustrates an exemplary Text-to-Speech system in which a vocoder may be implemented according to an embodiment.

FIG. 1 illustrates an exemplary Text-to-Speech (TTS) system 100 in which a vocoder may be implemented according to an embodiment.

In FIG. 1, a general TTS system 100 may comprise a text analyzer 110, a prosody predictor 120, a duration model 130, an acoustic model 140 and a vocoder 150. The text analyzer 110 may receive an input 101, such as text input, and perform operations on the input, for example, text normalization, analysis, etc., to convert the text input to pronunciation of the text, which is delivered to the prosody predictor 120. The prosody predictor 120 may perform language analysis to the pronunciation of the text, for example, analyzing break, pitch accent, etc., of the pronunciation of the text, to obtain a predicted prosody event. The duration model 130 may receive the predicted prosody event and obtain linguistic features based on the received predicted prosody event. The linguistic features may be fed to the acoustic model 140 to be further processed. The acoustic model 140 may obtain acoustic features based on the linguistic features and feed the acoustic features to the vocoder 150. The vocoder 150 may generate and output a speech waveform 102 from the acoustic features.

It should be appreciated that all the entities shown in FIG. 1 are exemplary, and depending on specific application requirements, any other entities may be involved in the TTS system 100.

Figure 2:
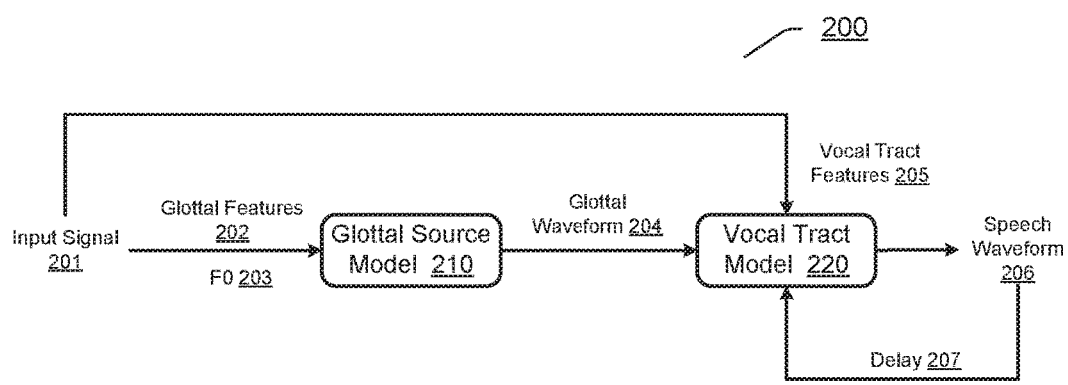
FIG. 2 illustrates an exemplary neural vocoder system for generating a speech waveform according to an embodiment.

FIG. 2 illustrates an exemplary neural vocoder system 200 for generating a speech waveform according to an embodiment.

In one exemplary implementation, the neural vocoder system 200 may be implemented as a vocoder in a TTS system, e.g., the vocoder 150 in the TTS system 100 in FIG. 1.

The neural vocoder system 200 may comprise a glottal source model 210 and a vocal tract model 220. The glottal source model 210 may be configured to mimic glottal source vibration and generate a glottal waveform 204 from glottal features 202 and fundamental frequency information 203, i.e., F0 information, generated based on an input signal 201. The generated glottal waveform 204 may be delivered to the vocal tract model 220. The glottal features 202 may include a phase feature, a shape feature and an energy feature. As illustrated, in addition to the glottal features and the fundamental frequency information, vocal tract features 205 may also be generated based on the input signal 201 and may be fed into the vocal tract model 220. The vocal tract model 220 may be configured to mimic vocal tract filtering effect and generate a speech waveform 206 based at least on the vocal tract features 205 and the glottal waveform 204. As an alternative way, the generated speech waveform 206 may be fed back to the vocal tract model 220 with a frame-delay 207 as a previous frame of speech waveform.

It should be appreciated that the glottal features, the vocal tract features and the fundamental frequency information may be generated based on the input signal through various suitable manners, including but not limited to, for example, glottal inverse filtering (GIF), glottal closure instance (GCI) detection, voiced/unvoiced (V/UV) detection, glottal feature extraction and interpolation techniques, as discussed below. Although an input signal may be a text input signal in an implementation of applying the neural vocoder 200 in a TTS system, such input signal 201 may also be a speech signal, or an audio signal, or a video signal, etc. in some other implementations.

Figure 3:
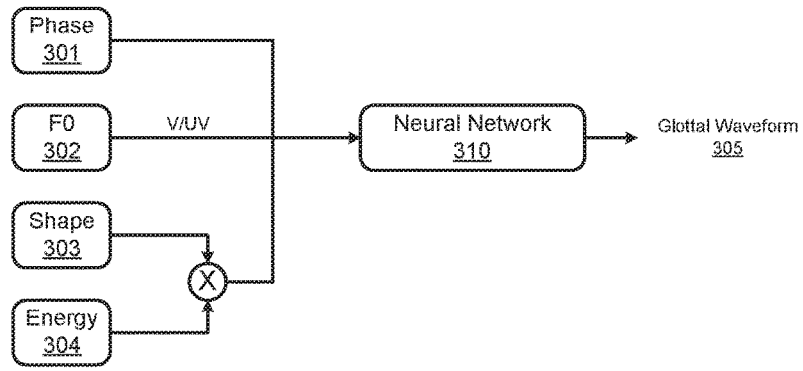
FIG. 3 illustrates an exemplary general glottal source model implemented through a neural network according to an embodiment.

FIG. 3 illustrates an exemplary general glottal source model 300 implemented through a neural network 310 according to an embodiment.

As shown in FIG. 3, the neural network 310 receives a phase feature 301, a shape feature 303, an energy feature 304 of the glottal features, and fundamental frequency information 302, e.g., F0 information. The phase feature 301 may represent time series or timing for waveform interpolation, the shape feature 303 and the energy feature 304 may represent characteristic waveform (CW) information. The fundamental frequency information 302 may indicate voiced/unvoiced information, e.g., indicating whether a current frame or a current segment is a voiced frame or an unvoiced frame. As illustrated, the shape feature 303 may be multiplied by the energy feature 304 to recover original amplitude of characteristic waveform feature, e.g., a prototype component.

The neural network 310 may process the received features and generate a glottal waveform 305 based on the received features. An exemplary structure of the neural network 310 will be discussed below in reference to FIG. 4.

Figure 4:
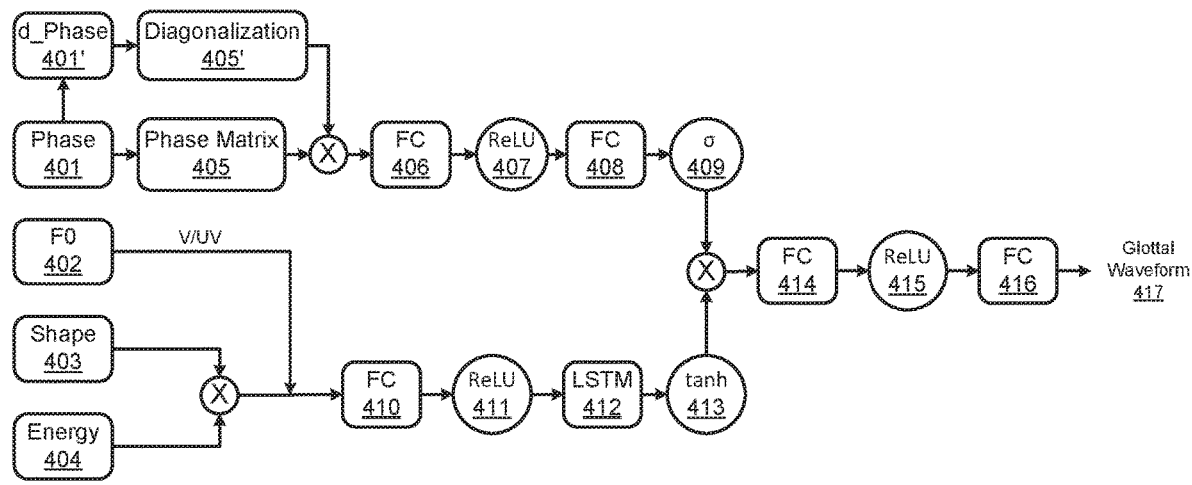
FIG. 4 illustrates an exemplary structure of a neural network in a glottal source model according to embodiments.

FIG. 4 illustrates an exemplary structure of a neural network in a glottal source model 400 according to embodiments.

As shown in FIG. 4, an exemplary structure of a neural network, such as the neural network 310 in FIG. 3, comprises a phase matrix unit 405, a plurality of fully connected layer units 406, 408, 410, 414, 416, a plurality of Rectified Linear Units (ReLU) 407, 411, 415, a sigmoid (σ) function unit 409, a long-short-term memory (LSTM) unit 412, and a tanh function unit 413. The phase matrix unit 405 may be used for stacking the phase feature to a phase matrix. Then two fully connected layer units 406, 408 in combination with the ReLU unit 407, the sigmoid function unit 409 may be used to perform non-linear transformation on the phase matrix to obtain a phase weighting matrix. The LSTM unit 412 in combination with a fully connected layer unit 410, a ReLU unit 411 and a tanh function unit 413 may be used to obtain a prototype component from the shape feature 403 and the energy feature 404. Herein, the LSTM unit 412 may be adopted to capture history sequence information. The output glottal waveform 417 may be generated by the product of the above two streams through two fully connected (FC) layer units 414, 416 and the ReLU unit 415, which is an prediction of a target glottal waveform.

Phase-Based Weighting Matrix

Phase information or phase feature may represent timing for waveform interpolation. This feature may be processed before multiplying with energy and shape in a glottal pulse. Glottal pulses, composing a glottal waveform, may be parameterized into energy, shape (such as Discrete Cosine Transform (DCT) coefficients) and phase. A phase-based weighting matrix may be used to reconstruct a glottal waveform. The glottal waveform u(n, Ø(n, k)) may be reconstructed as follows:

$$u(n, \emptyset(n, k)) = \sum_{l=-\infty}^{\infty} c(n, lT_s)\text{sinc}(\emptyset(n, k) - lT_s) \approx \sum_{l=1}^{L} c(n, lT_s)f(\emptyset(n, k) - lT_s)$$ Equation (1)

wherein Ø(n, k) denotes the k-th component of phase in the n-th frame, and c(n, l) denotes the l-th component of the characteristic waveform in the n-th frame, sinc(t) represents a sinc function, which is equal to sin(t)/t, L is a length of the characteristic waveform, $T_s$ represents a sampling interval of the characteristic waveform, which is equal to 2π/L. The Equation (1) may request the characteristic waveform satisfying the Nyquist sampling rate. As the length of characteristic waveform is finite, the sinc function may be replaced by other interpolation functions in the local region, e.g., spline functions, represented as ƒ(t). Thus, an approximation result may be obtained in the Equation (1).

The phase feature of Ø(n, k) may be vectorized as variable Φ(n), the characteristic waveform of c(n, l) may be vectorized as variable c(n), and the reconstructed glottal waveform u(n, Ø(n, k)) in the n-th frame may be vectorized as u(n, Φ(n)), shown as follows:

$$\Phi(n)=[\emptyset(n,1),\emptyset(n,2),\ldots,\emptyset(n,k)]^T$$ Equation (2)

$$c(n)=[c(n,T_s),c(n,2T_s),\ldots,c(n,LT_s)]^T$$ Equation (3)

$$u(n,\Phi(n))=[u(n,\emptyset(n,1)),u(n,\emptyset(n,2)),\ldots,u(n,\emptyset(n,K))]^T$$ Equation (4)

$$F_{k,l}(\Phi(n))=f(\emptyset(n,k)-lT_s)g(\emptyset(n,k)-\emptyset(n,k-1))$$ Equation (5)

wherein K is the frame length, L is the characteristic waveform length, F(Φ(n)) is defined as the phase-based weighting matrix, k∈[1, K] and l∈[1, L], and g( ) represents a scaling information of the phase vector based on a difference sequence information of the phase. The difference sequence information of the phase may be represented as d_Phase and calculated as Φ(n, k)−Φ(n, k−1), for example, as d_Phase 401' in FIG. 4, which may then be diagonalized as D=diag{g(Φ(n, k)−Φ(n, k−1))}.

Based on the above vectorized variables, Equation (1) which represents the reconstructed waveform may have a vector version as follows:

$$u(n,\Phi(n))=F(\Phi(n))c(n)$$ Equation (6)

From the above Equation (6), the reconstructed waveform u(n, Φ(n)) may be decomposed to a product of the weighting matrix F(Φ(n)) and the characteristic waveform vector c(n).

The phase-based weighting matrix and the characteristic waveform vector may be predicted by leveraging a neural network, as shown in FIG. 3 and FIG. 4 and as discussed below, and may be multiplied together to reconstruct the glottal waveform.

Neural Network

As stated above, a phase-based weighting matrix may be introduced to reconstruct the glottal waveform through weighting the characteristic waveform component, as shown in Equation (6). Equations (2)-(5) may indicate that the weighting matrix function F(.) is a complicated non-linear function of the phase vector Φ(n). In order to simulate the phase-based weighting function, two fully connected (FC) layers, such as FC layer units 406, followed by different non-linear activations may be used. Further, as the characteristic waveform may be slowly changed in voiced segments or frames and rapidly changed in unvoiced segments or frames, a LSTM unit 409 may be adopt to capture history sequence information. Moreover, as for the phase weighting matrix, activation units, such as the ReLU unit 407 and the sigmoid unit 408, may be used to increase the regularization and boundary smoothness. As for the characteristic waveform, activation unit, such as the tanh function unit 410, may be used to increase the regularization and boundary smoothness.

To construct the phase-based weighting matrix, the phase vector which represents the phase feature 401 may be stacked to a phase matrix in the phase matrix unit 405. Alternatively, a difference sequence information of the phase, d_Phase 401' may be obtained based on the phase feature 401 and may be diagonalized through a diagonalization unit 405' to generate a diagonalized difference sequence information of the phase, to correct the phase matrix. The phase matrix and/or the diagonalized difference sequence information of the phase may be processed in the same manner as the matrix F(Φ(n)) defined in Equation (5) through the FC layer units, the ReLU unit and the sigmoid function unit. For example, the phase matrix and the diagonalized difference sequence information of the phase may be multiplied and the product of them may be processed through the FC layer units, the ReLU unit and the sigmoid function unit. The shape feature 403 may be multiplied by the energy feature 404 after exponential operation to recover the original amplitude of characteristic waveform. The energy modulated shape feature may be fed to the LSTM unit 409 with V/UV feature indicated by fundamental frequency information, such as F0 402. After the sigmoid function unit 408 and the tanh function unit 410, the phased-based weighting matrix may be multiplied by the output of the LSTM unit 409, which is shown as a weighting multiplication in Equation (6). The glottal waveform 411 may be generated or reconstructed after delivering the product of the phased-based weighting matrix with the output of the LSTM unit, such as the characteristic waveform vector, through two additional fully connected layer units 406 and the additional ReLU unit 407.

It should be appreciated that although it is illustrated that a structure of the neural network in a glottal source model in FIG. 4 may comprise the above shown elements, the neural network may comprise any other elements additionally or alternatively. For example, the neural network in the glottal source model for generating a glottal waveform may comprise Gated Recurrent Unit (GRU), Recurrent Neural Network (RNN), Bi-LSTM, Bi-GRU, Bi-RNN, and so on.

After the glottal waveform is generated, a speech waveform may be synthesized based on the generated glottal waveform and vocal tract features, for example, by filtering the generated glottal waveform with the vocal tract features, as discussed below in reference to FIG. 5.

Figure 5:
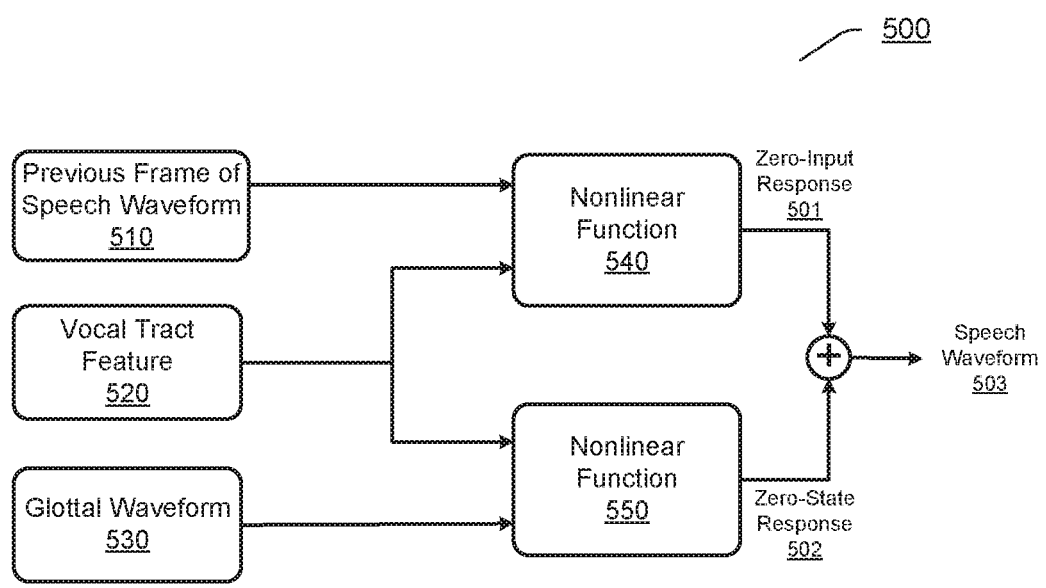
FIG. 5 illustrates an exemplary general vocal tract model according to an embodiment.

FIG. 5 illustrates an exemplary general vocal tract model 500 according to an embodiment.

As shown in FIG. 5, there are two nonlinear function units 540 and 550 for generating a speech waveform 503. The nonlinear function unit 540 may receive the previous frame of speech waveform 510 and vocal tract feature 520 to generate a zero-input response 501 from them. Herein, the zero-input response 501 may indicate a response generated based on history state information rather than current input information. The nonlinear function unit 550 may receive glottal waveform 530 and vocal tract feature 520 to generate a zero-state response 502 from them. Herein, the zero-state response 502 may indicate a response generated based on current input information rather than history state information. The glottal waveform 530 in FIG. 5 may be the generated glottal waveform by using a glottal source model discussed above.

The zero-input response 501 and the zero-state response 502 may be combined to generate a speech waveform 503 as follows:

$$\vec{S}(n) = f_{zi}(\vec{a}(n), \vec{S}(n-1)) + f_{zs}(\vec{a}(n), \vec{g}(n)) \qquad \text{Equation (7)}$$

wherein $\vec{S}(n)$ represents a speech waveform in the n-th frame; $\vec{S}(n-1)$ represents a speech waveform in the (n−1)-th frame, e.g., the previous frame of speech waveform 510 shown in FIG. 5; g(n) represents a glottal waveform in the n-th frame; and a(n) represents a vocal tract feature in the n-th frame. Further, $f_{zi}()$ represents a zero-input response function, e.g., the nonlinear function unit 540 shown in FIG. 5; and $f_{zs}()$ represents a zero-state response function, e.g., the nonlinear function unit 550 shown in FIG. 5.

The nonlinear function units 540 and 550 shown in FIG. 5 may be implemented by a neural network, as discussed below in reference to FIG. 6.

Figure 6:
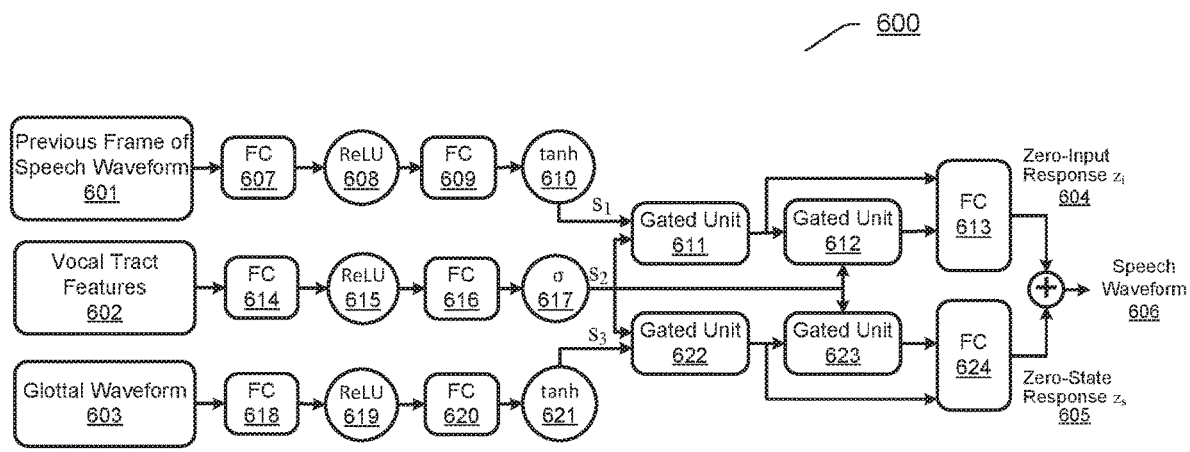
FIG. 6 illustrates an exemplary structure of a vocal tract model implemented through a neural network according to an embodiment.

FIG. 6 illustrates an exemplary structure of a vocal tract model 600 implemented through a neural network according to an embodiment.

As illustrated, when the previous frame of speech waveform 601 goes through fully connected (FC) layer units 607, 609, a ReLU unit 608, and a tanh function unit 610, a first stream $s_1$ of processing result for the previous frame of speech waveform 601 may be generated and be fed to the gated unit 611. When vocal tract features 602 go through FC layer units 614, 616, a ReLU unit 615, and a sigmoid function unit 617, a second stream $s_2$ of processing result for the vocal tract features 602 may be generated and be fed to the gated units 611, 612, 622, 623. The two streams $s_1$ and $s_2$ may go through the gated units 611, 612 and a FC layer unit 613 to obtain a zero-input response $z_i$ 604. When a glottal waveform 603 goes through FC layer units 618, 620, a ReLU unit 619, and a tanh function unit 621, a third stream $s_3$ of processing result for the glottal waveform 603 may be generated and be fed to the gated units 622, 623 and a FC layer unit 624 along with the second stream $s_2$, to obtain a zero-state response $z_s$ 605. After the zero-input response $z_i$ and the zero-state response $z_s$ are obtained, they may be combined together to generate a speech waveform 606.

It should be appreciated that all the elements shown in the structure of the neural network in the vocal tract model in FIG. 6 are exemplary, and depending on specific application requirements, any shown elements may be omitted and any other elements may be involved in the structure of the neural network in a vocal tract model. For example, the neural network in the vocal tract model for generating a speech waveform may comprise Gated Recurrent Unit (GRU), Recurrent Neural Network (RNN), Bi-LSTM, Bi-GRU, Bi-RNN, and so on.

Figure 7:
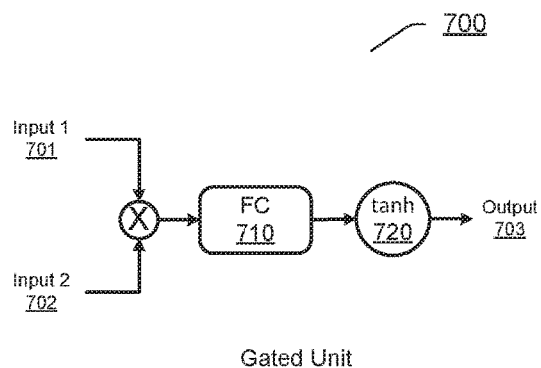
FIG. 7 illustrates an exemplary structure of a gated unit employed in the vocal tract model shown in FIG. 6 according to an embodiment.

FIG. 7 illustrates an exemplary structure of a gated unit 700 employed in the vocal tract model shown in FIG. 6 according to an embodiment.

As shown in FIG. 7, there may be two inputs, input 1 701 and input 2 702. These two inputs may be multiplied together and the product of the two inputs may be processed through a fully connected layer unit 710 and a tanh function unit 720, to generate an output 703.

It should be appreciated that all the elements shown in the structure of the gated unit 700 in FIG. 7 are exemplary, and depending on specific application requirements, any shown elements may be omitted and any other elements may be involved in the structure of the gated unit 700. For example, the gated unit 700 may comprise only a fully connected layer unit without a tanh function unit and/or with other nonlinear activation functions, and so on.

Figure 8:
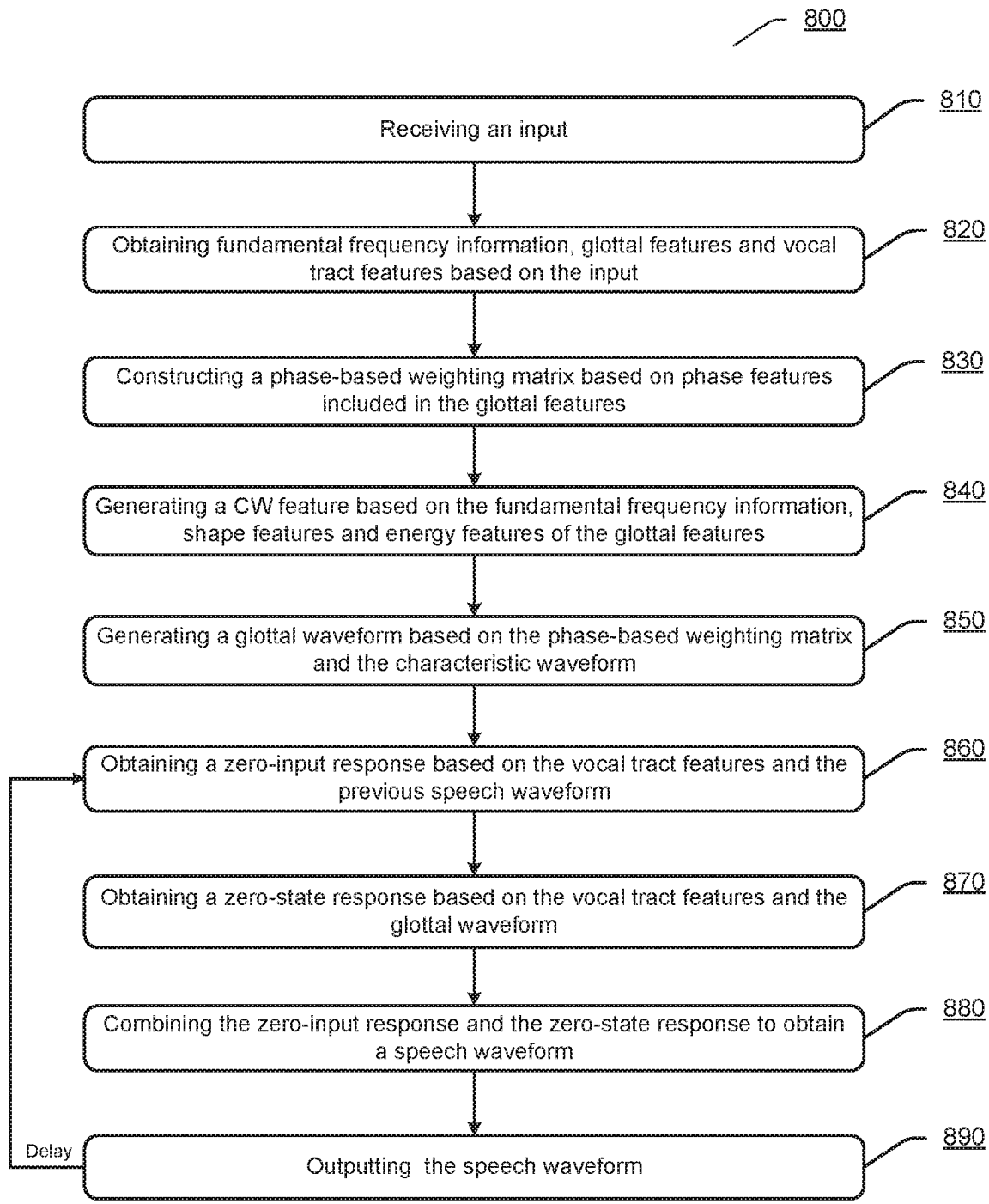
FIG. 8 illustrates an exemplary process for speech synthesis by a neural vocoder according to an embodiment.

FIG. 8 illustrates an exemplary process 800 for speech synthesis by a neural vocoder according to an embodiment. Through the process 800, a speech waveform may be generated based at least on glottal features, vocal tract features and fundamental frequency information.

At 810, an input may be received. Herein, the input may be in a form of text, speech, video, etc.

At 820, fundamental frequency information, glottal features and vocal tract features may be obtained based on the input. The glottal features may comprise phase features, shape features and energy features. In a case of the input being a text input, acoustic features may be obtained through text-to-speech (TTS) processing on the text input. Then the glottal features, vocal tract features and fundamental frequency information may be extracted from the acoustic features.

At 830, a phase-based weighting matrix may be constructed based on phase features included in the glottal features. In one example, the phase-based weighting matrix may be constructed through the following steps: stacking the phase features to form a phase matrix; performing nonlinear transformation on the phase matrix through a neural network to obtain the phase-based weighting matrix. In one implementation, the neural network may comprise one or more FC layer units, a ReLU unit and a sigmoid unit.

At 840, a characteristic waveform feature may be generated based on the fundamental frequency information, shape features and energy features of the glottal features. In one example, the shape features and the energy features may be multiplied to obtain a product of these two features. The product may go through a neural network to obtain the characteristic waveform feature. Such neural network may comprise, e.g., a FC layer unit, a ReLU unit, a LSTM unit and a tanh function unit.

At 850, a glottal waveform may be generated based on the phase-based weighting matrix and the characteristic waveform feature. In one example, the phase-based weighting matrix and the characteristic waveform feature may be multiplied to obtain a product. The glottal waveform may be generated after passing the product through one or more additional fully connected layers.

At 860, a zero-input response may be obtained based on the vocal tract features and the previous speech waveform, such as a previous frame of speech waveform.

At 870, a zero-state response may be obtained based on the vocal tract features and the glottal waveform generated at 850. The zero-input response and the zero-state response may be obtained through a gated unit neural network comprising one or more gated units.

At 880, a speech waveform may be generated by combining the zero-input response and the zero-state response. In one example, the speech waveform may be a summation of the zero-input response and the zero-state response.

At 890, the generated speech waveform may be outputted. The generated speech waveform may also be fed back to step 860 with a frame delay as a previous speech waveform for the next input.

It should be appreciated that all the elements shown in the exemplary process 800 for speech synthesis by a neural vocoder in FIG. 8 are exemplary, and depending on specific application requirements, any shown elements may be omitted and any other elements may be involved in the process 800 for speech synthesis by a neural vocoder.

The glottal source model and the vocal tract model illustrated in the neural vocoder system may be trained to work better. The exemplary training processes for these two models will be described below.

Figure 9:
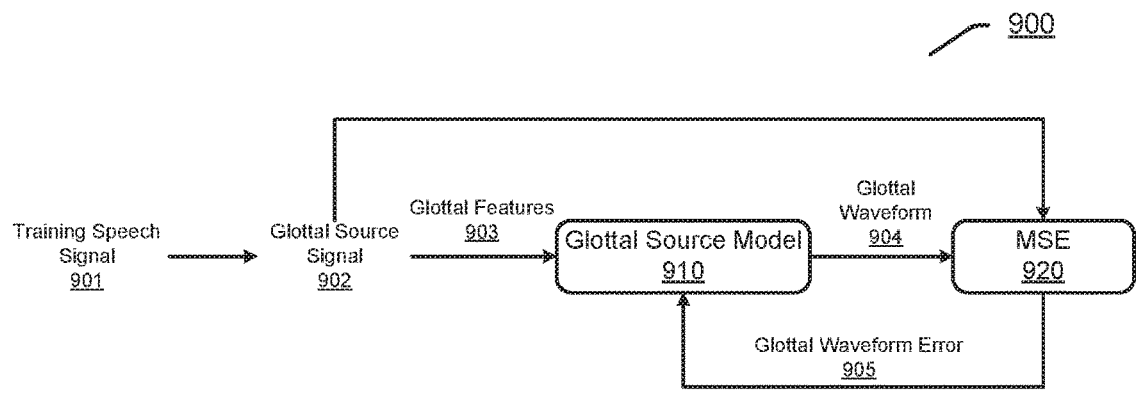
FIG. 9 illustrates an exemplary training process for the glottal source model according to an embodiment.

FIG. 9 illustrates an exemplary training process 900 for a glottal source model according to an embodiment.

A training speech signal 901 may be decomposed into a glottal source signal 902 and vocal tract features (not shown in FIG. 9). Such training speech signal 901 may be received from a user or a database. Glottal features 903 may be extracted from the glottal source signal 902. The glottal features 903 may include phase features, shape features and energy features and may be delivered to a glottal source model 910 to obtain a glottal waveform 904. During the training process, a mean square error (MSE) unit 920 may be adopted to optimize the glottal source model. The MSE unit 920 may receive the glottal waveform 904 and the glottal source signal 902 and compare them to obtain a glottal waveform error 905. The glottal waveform error 905 may then be fed back to the glottal source model 910 to optimize it. It should be appreciated that, although an MSE unit 920 is adopted in the training process 900, any other loss function may be employed depending on specific application requirements.

Figure 10:
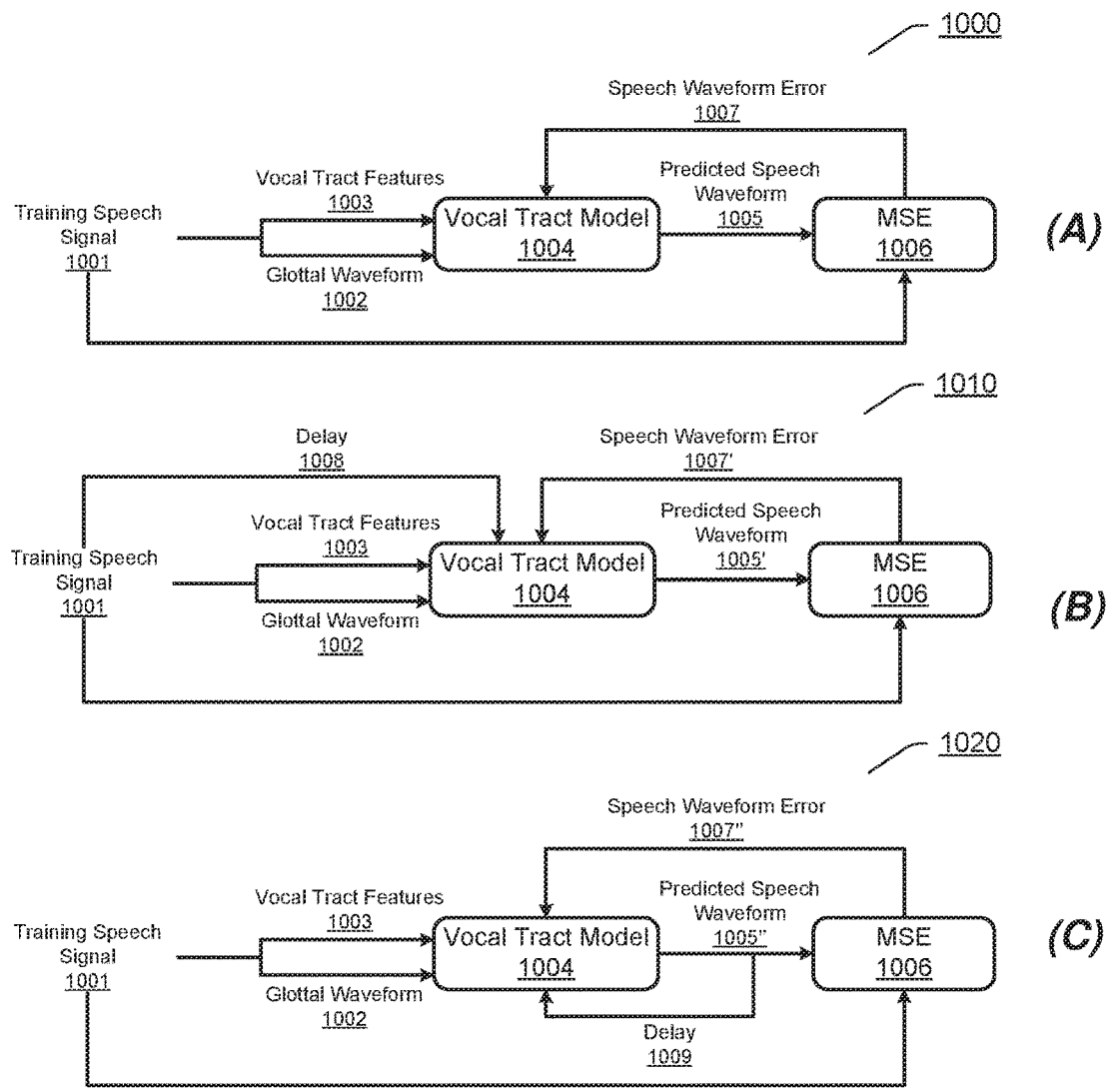
FIG. 10 illustrates an exemplary training process for the vocal tract model according to an embodiment.

FIG. 10 illustrates an exemplary training process 1000, 1010, 1020 for a vocal tract model according to an embodiment. In FIG. 10, graph (A) is for a general training process 1000 for a vocal tract model, and graphs (B) and (C) is for an exemplary two-stage training process for a vocal tract model for correcting the mismatch between a predicted speech and a training speech signal, wherein graph (B) is for the first stage 1010 of the two-stage training process, and graph (C) is for the second stage 1020 of the two-stage training process.

In graph (A), a training speech signal 1001 may be decomposed into a glottal source signal (not shown in FIG. 10) and vocal tract features 1003. The vocal tract features 1003 may be delivered to a vocal tract model 1004 along with a glottal waveform 1002 to obtain a predicted speech waveform 1005. The training speech signal 1001 may be received from a user or a database, and the glottal waveform 1002 may be generated from the training speech signal 1001 by a glottal source model or obtained from a database. During the training process, a mean square error (MSE) unit 1006 may be adopted to optimize the vocal tract model 1004. The MSE unit 1006 may receive the generated predicted speech waveform 1005 and the training speech signal 1001 and compare them to obtain a speech waveform error 1007. The speech waveform error 1007 may then be fed back to the vocal tract model 1004 to optimize it. It should be appreciated that, although a MSE unit 1006 is adopted in the training process 1000, any other loss function may be employed depending on specific application requirements.

In graph (B) for the first stage 1010 of a two-stage training process for the vocal tract model, the training speech signal 1001 may be used as both training feature and a target, and the vocal tract model 1004 may be trained by using the training speech signal 1001 by one frame delay 1008. The vocal tract model 1004 may receive glottal waveform 1002, vocal tract features 1003, and a training speech signal 1001 with one frame delay 1008, as a previous frame of speech signal/waveform, and generate a predicted speech waveform 1005'. The predicted speech waveform 1005' may be fed into a MSE unit 1006 along with the training speech signal 1001 to obtain a speech waveform error 1007'. The speech waveform error 1007' may be fed back to the vocal tract model 1004 to optimize the vocal tract model 1004. The training process in the first stage may be performed several times to make the vocal tract model working better.

In graph (C) for the second stage 1020 of a two-stage training process for the vocal tract model, the predicted speech waveform 1005" generated by the vocal tract model 1004 with one frame delay 1009 may be used as training feature, such as a previous frame of speech waveform, to be fed back to the vocal tract model 1004 along with the glottal waveform 1002, vocal tract features 1003, and the training speech signal 1001 may be used as the target to calculate the speech waveform error 1007" through the MSE unit 1006 in comparison with the predicted speech waveform 1005".

Through the two-stage training, the mismatch between a predicted speech and a training speech signal in the vocal tract model 1004 may be corrected.

Figure 11:
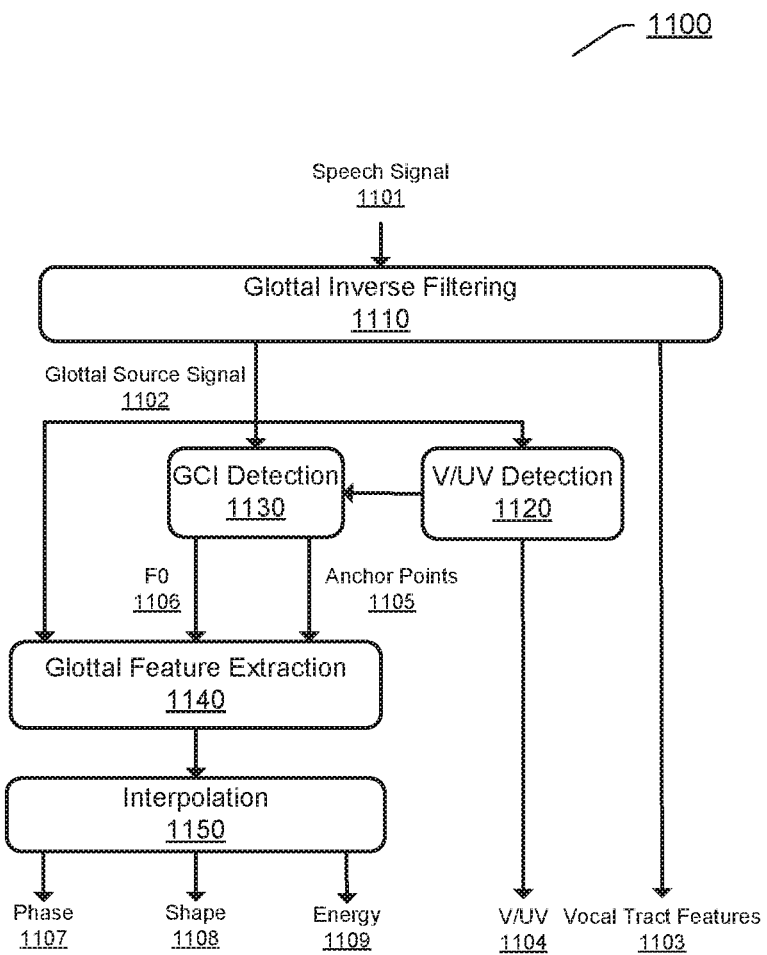
FIG. 11 illustrates an exemplary feature extraction process during the training process according to an embodiment.

FIG. 11 illustrates an exemplary feature extraction process 1100 during the training process according to an embodiment.

A speech signal 1101 may be received and decomposed into a glottal source signal 1102 and vocal tract features 1103 by a glottal inverse filtering unit 1110. Glottal features may be extracted from the glottal source signal 1102. The glottal features may include phase features, shape features and energy features. The glottal feature extraction process will be described as follows. A Voiced/Unvoiced detection unit 1120 may be adopted to label voiced and unvoiced frames or segments 1104 and send the voiced/unvoiced information to a glottal closure instants (GCI) detection unit 1130. The GCI detection unit 1130 may be adopted to extract anchor points 1105 for marking a starting point and/or an ending point of each pitch cycle in the voiced segment. In the unvoiced segments, pseudo anchor points may be calculated according to an interpolated fundamental frequency value F0 1106 between the nearest voiced frames. A prototype glottal waveform may be extracted between the anchor points and delivered to a glottal feature extraction 1140 for extracting glottal features from the prototype glottal waveform. Phase feature 1107 may be calculated by linear interpolation 1150 between neighboring anchor points from 0 to a in sample level in both voiced and unvoiced frames. After size and energy normalization, shape features 1108 and energy features 1109 may be obtained. Energy features 1109 may be represented as Logarithm scale.

To extract shape and energy features, a glottal pulse may be extracted and interpolated to a fixed length, or a length of the glottal pulse may be adjusted to a fixed length by zero padding without interpolation or by a mixture manner between zero padding and interpolation. The energy of the interpolated glottal pulse may be calculated and transformed to Logarithm. The shape feature may be extracted, for example, by normalizing the fixed length glottal pulse to unit energy. In some examples, the shape feature may be represented as DCT coefficients or other features, such as Discrete Fourier Transform (DFT) coefficients, Bottleneck features from a pre-trained neural network, and so on. The pitch-synchronized shape and energy features may be rearranged into each frame by linear interpolation, such as by interpolation unit 1150.

Glottal Inverse Filtering (GIF)

Glottal inverse filtering (GIF) is a procedure to estimate glottal source signal and vocal tract features from the speech signal. In one example, iterative adaptive inverse filtering (IAIF) algorithm may be adopted to automatically decompose the speech signal into the glottal source signal and the vocal tract features in adaptive manner and converge with several iterations. Any other inverse filtering algorithm rather than IAIF algorithm may also be employed depending on specific application requirements. The vocal tract features may be parameterized as line spectrum pair (LSP) coefficients, line spectrum frequency coefficients, linear prediction filter coefficients, reflection coefficients, Logarithm area ratio, linear spectrum coefficients, Mel-spectrum coefficients, Mel Frequency Cepstrum Coefficient (MFCC), and so on.

Glottal Feature Extraction

The glottal features may be extracted by referring to waveform interpolation vocoders. These features may be fundamental phase, shape and energy features, wherein the fundamental phase may represent time series and fundamental frequency information, the shape and energy features may represent a characteristic waveform information. From waveform interpolation coding, a glottal pulse and the fundamental phase may form a characteristic waveform surface. A periodic function u(n, ø) with the fundamental phase ø extracted at the n-th frame may be represented as follows:

$$u(n,\emptyset)=\Sigma_{k=1}^{P(n)/2}[A_k \cos(k\emptyset)+B_k \sin(k\emptyset)] \quad \text{Equation (8)}$$

wherein the fundamental phase Ø(n, m) may denote the m-th component of the characteristic waveform extracted at the n-th frame, which may be defined as:

$$\phi(n, m) = \frac{2\pi m}{P(n)} = \frac{2\pi m F_0(n)}{F_s} \quad \text{Equation (9)}$$

where P(n) may denote a time-varying pitch period in the n-th frame. $A_k$ and $B_k$ may denote the k-th discrete time Fourier series coefficients of the characteristic waveform. $F_0(n)$ may represent the fundamental frequency in n-th frame. $F_s$ may represent a sampling rate. Such fundamental phase and characteristic waveform features may be used to reconstruct the glottal waveform.

Although the glottal source model and the vocal tract model may be trained separately as discussed above, they may also be trained jointly as below.

Figure 12:
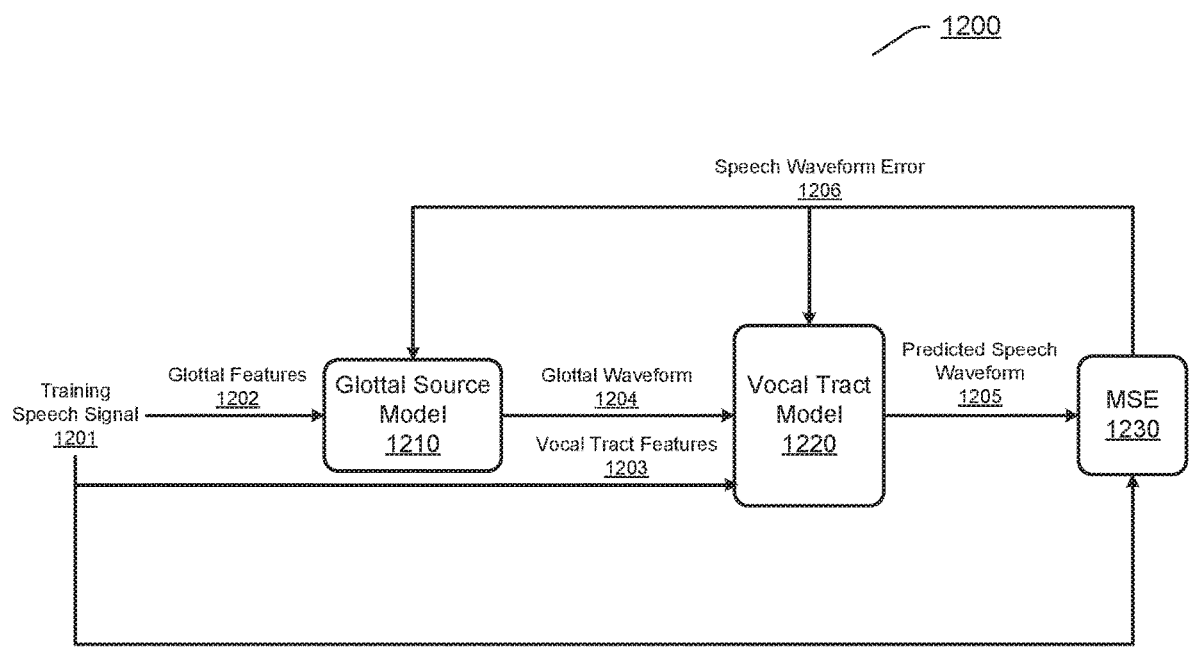
FIG. 12 illustrates an exemplary joint training process for the glottal source model and the vocal tract model according to an embodiment.

FIG. 12 illustrates an exemplary joint training process 1200 for a glottal source model 1210 and a vocal tract model 1220 according to an embodiment.

As for the neural vocoder system comprising the glottal source model 1210 and the vocal tract model 1220, to further improve the performance, these two models may be trained by connection together. Thus a joint training may be used for correcting the mismatch between the glottal source model 1210 and the vocal tract model 1220. As illustrated, glottal features 1202 and vocal tract features 1203 may be extracted from the training speech signal 1201. The glottal features 1202 may be delivered to the glottal source model 1210. The vocal tract features 1203 may be delivered to the vocal tract model 1220. Based on the glottal features 1202, the glottal source model 1210 may generate a glottal waveform 1204. The vocal tract model 1220 may receive the vocal tract features 1203 along with the generated glottal waveform 1204 to generate a predicted speech waveform 1205. Such predicted speech waveform 1205 may be fed into the MSE unit 1230 along with the training speech signal 1201. The MSE unit 1230 may generate a speech waveform error 1206 based on the predicted speech waveform 1205 and the training speech signal 1201, for example, by comparing the predicted speech waveform 1205 and the training speech signal 1202 to obtain a difference between them. The speech waveform error 1206 may be fed back to the glottal source model 1210 and/or the vocal tract model 1220, to optimize the vocoder system comprising the glottal source model and the vocal tract model. Through the joint training for the vocoder system, mismatch between the glottal source model and the vocal tract model may be corrected.

Figure 13:
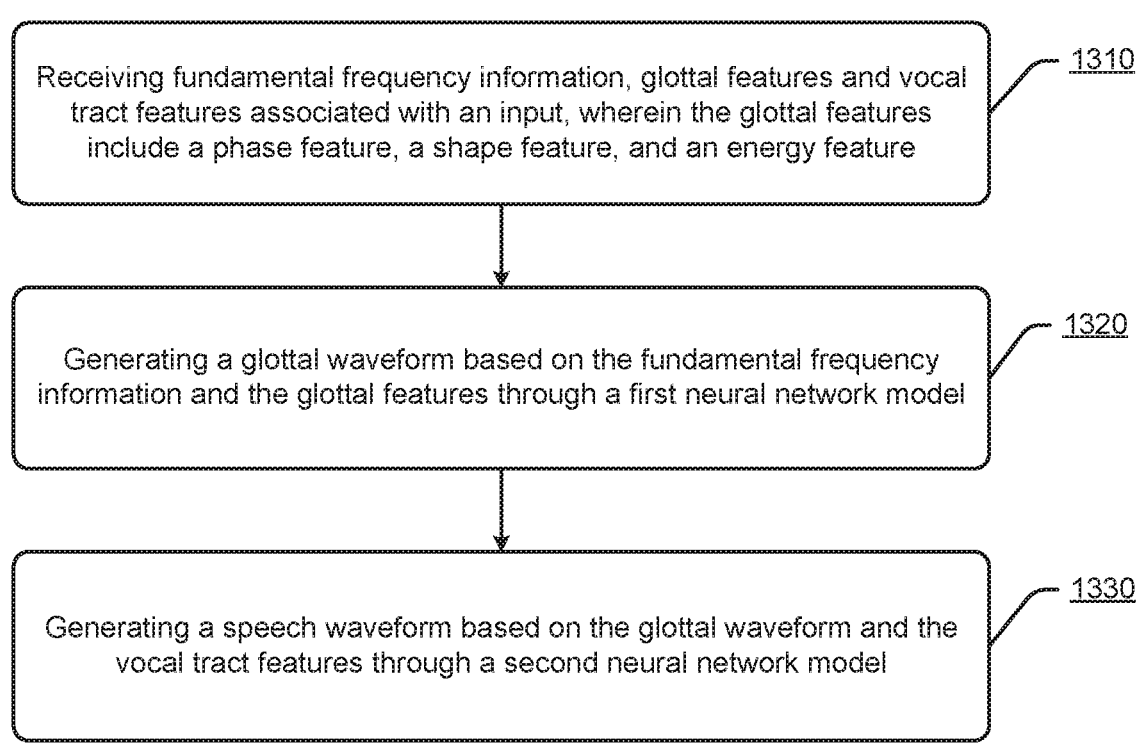
FIG. 13 illustrates a flowchart of an exemplary method for a neural vocoder according to an embodiment.

FIG. 13 illustrates a flowchart of an exemplary method 1300 for generating a speech waveform according to an embodiment.

At 1310, fundamental frequency information, glottal features and vocal tract features associated with an input are received. The glottal features may include a phase feature, a shape feature, and an energy feature.

At 1320, a glottal waveform may be generated based on the fundamental frequency information and the glottal features through a first neural network model.

At 1330, a speech waveform may be generated based on the glottal waveform and the vocal tract features through a second neural network model.

In an implementation, the phase feature is represented by phase vectors, the shape feature is represented by shape vectors, and the energy feature is represented by energy vectors. The glottal waveform may be generated further through the following steps: forming a phase matrix from the phase vectors; constructing a phase-based weighting matrix by converting the phase matrix nonlinearly through a first part of the first neural network model; generating a characteristic waveform feature based on the fundamental frequency information, the shape vectors and the energy vectors through a second part of the first neural network model; and obtaining the glottal waveform based on the phase-based weighting matrix and the characteristic waveform feature.

In an implementation, the glottal waveform may be obtained by multiplying the phase-based weighting matrix with the characteristic waveform feature through a third part of the first neural network model.

In an implementation, the speech waveform may be generated on a frame basis.

In an implementation, the method may further comprise receiving a previous frame of speech waveform. In an implementation, the speech waveform may be generated further based on the previous frame of speech waveform.

In an implementation, the speech waveform may be generated further through the following steps: obtaining a zero-state response based on the glottal waveform and the vocal tract features through a first part of the second neural network model; obtaining a zero-input response based on the vocal tract features and the previous frame of speech waveform through a second part of the second neural network model; and obtaining the speech waveform by combining the zero-state response and the zero-input response.

In an implementation, the first part and the second part of the second neural network model may be for performing nonlinear conversion respectively.

In an implementation, the first part of the second neural network model may include at least one gated unit for combining the glottal waveform and the vocal tract features, and the second part of the second neural network model may include at least one gated unit for combining the vocal tract features and the previous frame of speech waveform.

In an implementation, the input may be a text input. In an implementation, the fundamental frequency information, the glottal features and the vocal tract features associated with the input may be generated based on the text input through text-to-speech (TTS) processing.

In an implementation, the first neural network model may be trained through the following steps: receiving a training speech signal comprising a glottal source signal and a vocal tract training feature; extracting fundamental frequency training information, a phase training feature, a shape training feature and an energy training feature from the glottal source signal; obtaining a reconstructed glottal waveform based on the fundamental frequency training information, the phase training feature, the shape training feature and the energy training feature through the first neural network model; comparing the reconstructed glottal waveform with the glottal source signal to obtain a glottal waveform error; and optimizing the first neural network model based on the glottal waveform error.

In an implementation, the extracting step may further comprise: obtaining the glottal source signal from the training speech signal through a glottal inverse filtering; performing Voiced/Unvoiced detection on the glottal source signal to identify voiced segments and unvoiced segments; performing glottal closure instants (GCI) detection on the voiced segments to obtain the fundamental frequency training information of the voiced segments; interpolating the fundamental frequency training information to the unvoiced segments; and obtaining the phase training feature, the shape training feature and the energy training feature from the voiced segments and the unvoiced segments based on the fundamental frequency training information.

In an implementation, the second neural network model may be trained through the following steps: obtaining the vocal tract training feature from the training speech signal through a glottal inverse filtering; receiving the reconstructed glottal waveform; obtaining a reconstructed speech waveform based on the vocal tract training feature and the reconstructed glottal waveform through the second neural network model; comparing the reconstructed speech waveform with the training speech signal to obtain a speech waveform error; and optimizing the second neural network model and/or the first neural network model based on the speech waveform error.

It should be appreciated that the method 1300 may further comprise any steps/processes for generating a speech waveform according to the embodiments of the present disclosure as mentioned above.

Figure 14:
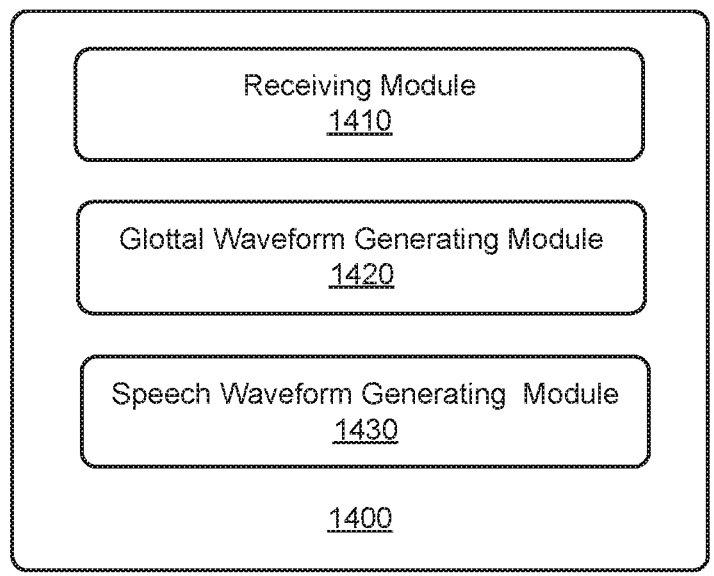
FIG. 14 illustrates an exemplary apparatus for a neural vocoder according to an embodiment.

FIG. 14 illustrates an exemplary apparatus 1400 for generating a speech waveform according to an embodiment.

The apparatus 1400 may comprise: a receiving module 1410, for receiving fundamental frequency information, glottal features and vocal tract features associated with an input, wherein the glottal features include a phase feature, a shape feature, and an energy feature; a glottal waveform generating module 1420, for generating a glottal waveform based on the fundamental frequency information and the glottal features through a first neural network model; and a speech waveform generating module 1430, for generating a speech waveform based on the glottal waveform and the vocal tract features through a second neural network model.

In an implementation, the phase feature is represented by phase vectors, the shape feature is represented by shape vectors, and the energy feature is represented by energy vectors. In an implementation, the glottal waveform generating module 1420 may further comprise: a forming module, for forming a phase matrix from the phase vectors; a constructing module, for constructing a phase-based weighting matrix by converting the phase matrix nonlinearly through a first part of the first neural network model; a characteristic waveform feature generating module, for generating a characteristic waveform feature based on the fundamental frequency information, the shape vectors and the energy vectors through a second part of the first neural network model; and an obtaining module, for obtaining the glottal waveform based on the phase-based weighting matrix and the characteristic waveform feature.

In an implementation, the speech waveform generating module 1430 may generate the speech waveform on a frame basis.

The apparatus 1400 may further comprise a previous frame of speech waveform receiving module, for receiving a previous frame of speech waveform. In an implementation, the speech waveform generating module may generate the speech waveform further based on the previous frame of speech waveform.

In an implementation, the speech waveform generating module 1430 may further comprise: a zero-state response obtaining module, for obtaining a zero-state response based on the glottal waveform and the vocal tract features through a first part of the second neural network model; a zero-input response obtaining module, for obtaining a zero-input response based on the vocal tract features and the previous frame of speech waveform through a second part of the second neural network model; and a speech waveform obtaining module, for obtaining the speech waveform by combining the zero-state response and the zero-input response.

In an implementation, the first part of the second neural network model may include at least one gated unit for combining the glottal waveform and the vocal tract features, and the second part of the second neural network model may include at least one gated unit for combining the vocal tract features and the previous frame of speech waveform.

In an implementation, the input may be a text input. In an implementation, the fundamental frequency information, the glottal features and the vocal tract features associated with the input may be generated based on the text input through text-to-speech (TTS) processing.

Moreover, the apparatus 1400 may also comprise any other modules configured to be used in a neural vocoder for generating a speech waveform according to the embodiments of the present disclosure as mentioned above.

Figure 15:
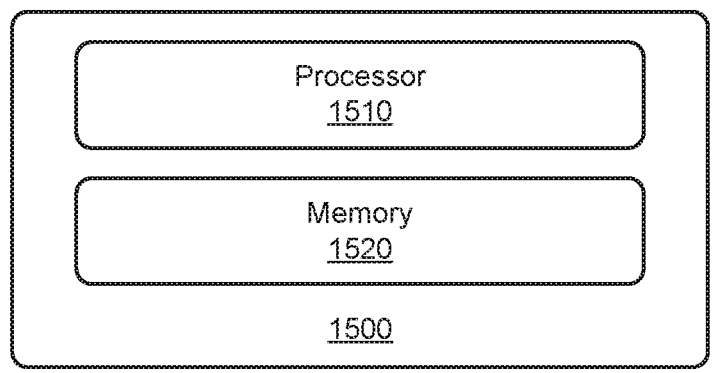
FIG. 15 illustrates an exemplary apparatus for a neural vocoder according to an embodiment.

FIG. 15 illustrates an exemplary apparatus 1500 for generating a speech waveform according to an embodiment. The apparatus 1500 may comprise one or more processors 1510 and a memory 1520 storing computer-executable instructions. When executing the computer-executable instructions, the one or more processors 1510 may: receive fundamental frequency information, glottal features and vocal tract features associated with an input, wherein the glottal features include a phase feature, a shape feature, and an energy feature; generate a glottal waveform based on the fundamental frequency information and the glottal features through a first neural network model; and generate a speech waveform based on the glottal waveform and the vocal tract features through a second neural network model.

The embodiments of the present disclosure may be embodied in a non-transitory computer-readable medium. The non-transitory computer-readable medium may comprise instructions that, when executed, cause one or more processors to perform any operations of the methods for providing a response to a user in a question-answering session according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout the present disclosure, the memory may be internal to the processors, e.g., cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for generating a speech waveform, comprising:
   receiving fundamental frequency information, glottal features and vocal tract features associated with an input, wherein the glottal features include a phase feature, a shape feature, and an energy feature, the phase feature being represented by phase vectors, the shape feature being represented by shape vectors, and the energy feature being represented by energy vectors;
   generating a glottal waveform based on the fundamental frequency information and the glottal features through a first neural network model, wherein the generating the glottal waveform further comprises:
      forming a phase matrix from the phase vectors;
      constructing a phase-based weighting matrix by converting the phase matrix nonlinearly through a first part of the first neural network model;
      generating a characteristic waveform feature based on the fundamental frequency information, the shape vectors and the energy vectors through a second part of the first neural network model; and
      obtaining the glottal waveform based on the phase-based weighting matrix and the characteristic waveform feature; and
   generating a speech waveform based on the glottal waveform and the vocal tract features through a second neural network model.

2. The method of claim 1, wherein the glottal waveform is obtained by multiplying the phase-based weighting matrix with the characteristic waveform feature through a third part of the first neural network model.

3. The method of claim 1, wherein the generating the speech waveform is performed on a frame basis.

4. The method of claim 3, further comprising:
   receiving a previous frame of speech waveform, and
   wherein the generating the speech waveform is further based on the previous frame of speech waveform.

5. The method of claim 4, wherein the generating the speech waveform further comprises:
   obtaining a zero-state response based on the glottal waveform and the vocal tract features through a first part of the second neural network model;
   obtaining a zero-input response based on the vocal tract features and the previous frame of speech waveform through a second part of the second neural network model; and
   obtaining the speech waveform by combining the zero-state response and the zero-input response.

6. The method of claim 5, wherein the first part and the second part of the second neural network model are for performing nonlinear conversion respectively.

7. The method of claim 5, wherein the first part of the second neural network model includes at least one gated unit for combining the glottal waveform and the vocal tract features, and the second part of the second neural network model includes at least one gated unit for combining the vocal tract features and the previous frame of speech waveform.

8. The method of claim 1, wherein the input is a text input, and wherein the fundamental frequency information, the glottal features and the vocal tract features associated with the input are generated based on the text input through text-to-speech (TTS) processing.

9. The method of claim 1, wherein the first neural network model is trained through:
receiving a training speech signal comprising a glottal source signal and a vocal tract training feature;
extracting fundamental frequency training information, a phase training feature, a shape training feature and an energy training feature from the glottal source signal;
obtaining a reconstructed glottal waveform based on the fundamental frequency training information, the phase training feature, the shape training feature and the energy training feature through the first neural network model;
comparing the reconstructed glottal waveform with the glottal source signal to obtain a glottal waveform error; and
optimizing the first neural network model based on the glottal waveform error.

10. The method of claim 9, wherein the extracting step further comprises:
obtaining the glottal source signal from the training speech signal through a glottal inverse filtering;
performing Voiced/Unvoiced detection on the glottal source signal to identify voiced segments and unvoiced segments;
performing glottal closure instants (GCI) detection on the voiced segments to obtain the fundamental frequency training information of the voiced segments;
interpolating the fundamental frequency training information to the unvoiced segments; and
obtaining the phase training feature, the shape training feature and the energy training feature from the voiced segments and the unvoiced segments based on the fundamental frequency training information.

11. The method of claim 9, wherein the second neural network model is trained through:
obtaining the vocal tract training feature from the training speech signal through a glottal inverse filtering;
receiving the reconstructed glottal waveform;
obtaining a reconstructed speech waveform based on the vocal tract training feature and the reconstructed glottal waveform through the second neural network model;
comparing the reconstructed speech waveform with the training speech signal to obtain a speech waveform error; and
optimizing the second neural network model and/or the first neural network model based on the speech waveform error.

12. An apparatus for generating a speech waveform, comprising:
a receiving module, for receiving fundamental frequency information, glottal features and vocal tract features associated with an input, wherein the glottal features include a phase feature, a shape feature, and an energy feature, the phase feature being represented by phase vectors, the shape feature being represented by shape vectors, and the energy feature being represented by energy vectors;
a glottal waveform generating module, for generating a glottal waveform based on the fundamental frequency information and the glottal features through a first neural network model, wherein the glottal waveform generating module further comprises:
a forming module, for forming a phase matrix from the phase vectors;
a constructing module, for constructing a phase-based weighting matrix by converting the phase matrix nonlinearly through a first part of the first neural network model;
a characteristic waveform feature generating module, for generating a characteristic waveform feature based on the fundamental frequency information, the shape vectors and the energy vectors through a second part of the first neural network model; and
an obtaining module, for obtaining the glottal waveform based on the phase-based weighting matrix and the characteristic waveform feature; and
a speech waveform generating module, for generating a speech waveform based on the glottal waveform and the vocal tract features through a second neural network model.

13. The apparatus of claim 12, wherein the speech waveform generating module generates the speech waveform on a frame basis.

14. The apparatus of claim 13, further comprising:
a previous frame of speech waveform receiving module, for receiving a previous frame of speech waveform, and wherein the speech waveform generating module generates the speech waveform further based on the previous frame of speech waveform.

15. The apparatus of claim 14, wherein the speech waveform generating module further comprises:
a zero-state response obtaining module, for obtaining a zero-state response based on the glottal waveform and the vocal tract features through a first part of the second neural network model;
a zero-input response obtaining module, for obtaining a zero-input response based on the vocal tract features and the previous frame of speech waveform through a second part of the second neural network model; and
a speech waveform obtaining module, for obtaining the speech waveform by combining the zero-state response and the zero-input response.

16. The apparatus of claim 15, wherein the first part of the second neural network model includes at least one gated unit for combining the glottal waveform and the vocal tract features, and the second part of the second neural network model includes at least one gated unit for combining the vocal tract features and the previous frame of speech waveform.

17. The apparatus of claim 12, wherein the input is a text input, and wherein the fundamental frequency information, the glottal features and the vocal tract features associated with the input are generated based on the text input through text-to-speech (TTS) processing.

18. An apparatus for a neural vocoder, the apparatus comprising:
one or more processors; and
a memory storing computer-executable instructions that, when executed, cause the one or more processors to:
receive fundamental frequency information, glottal features and vocal tract features associated with an input, wherein the glottal features include a phase feature, a shape feature, and an energy feature, the phase feature being represented by phase vectors, the shape feature being represented by shape vectors, and the energy feature being represented by energy vectors;
generate a glottal waveform based on the fundamental frequency information and the glottal features through a first neural network model, wherein when generating the glottal waveform, the computer-executable instructions further cause the one or more processor to:

form a phase matrix from the phase vectors;
construct a phase-based weighting matrix by converting the phase matrix nonlinearly through a first part of the first neural network model;
generate a characteristic waveform feature based on the fundamental frequency information, the shape vectors and the energy vectors through a second part of the first neural network model; and
obtain the glottal waveform based on the phase-based weighting matrix and the characteristic waveform feature; and
generate a speech waveform based on the glottal waveform and the vocal tract features through a second neural network model.

\* \* \* \* \*